United States Patent
Sato

(10) Patent No.: US 9,652,822 B2
(45) Date of Patent: May 16, 2017

(54) IMAGE CORRECTING APPARATUS, IMAGE CORRECTING METHOD AND COMPUTER READABLE RECORDING MEDIUM RECORDING PROGRAM THEREON

(71) Applicant: CASIO COMPUTER CO., LTD., Shibuya-ku, Tokyo (JP)

(72) Inventor: Takeshi Sato, Hamura (JP)

(73) Assignee: CASIO COMPUTER CO., LTD, Tokyo (JP)

(*) Notice: Subject to any disclaimer, the term of this patent is extended or adjusted under 35 U.S.C. 154(b) by 0 days.

(21) Appl. No.: 14/833,283

(22) Filed: Aug. 24, 2015

(65) Prior Publication Data
US 2016/0071236 A1    Mar. 10, 2016

(30) Foreign Application Priority Data
Sep. 9, 2014 (JP) ................................. 2014-182873

(51) Int. Cl.
| | | |
|---|---|---|
| G06K 9/00 | (2006.01) |
| G06K 9/40 | (2006.01) |
| G06T 3/00 | (2006.01) |
| G06T 5/00 | (2006.01) |
| G06K 9/32 | (2006.01) |

(52) U.S. Cl.
CPC ........ *G06T 3/0093* (2013.01); *G06K 9/00228* (2013.01); *G06K 9/3233* (2013.01); *G06T 5/006* (2013.01); *G06T 2207/30201* (2013.01)

(58) Field of Classification Search
CPC ..... G06T 3/0093; G06T 7/0042; G06T 5/006; G06T 5/50; G06T 2207/201216; G06T 2207/20021; G06T 2207/30201; G06K 9/2054; G06K 9/00228; G06K 9/3233

USPC .......................................... 382/118, 274, 282
See application file for complete search history.

(56) References Cited

U.S. PATENT DOCUMENTS 7,702,149 B2 * 4/2010 Ohkubo ............. G06K 9/00234
  358/518
8,325,998 B2 * 12/2012 Yang ................... G06K 9/00228
  340/5.53

(Continued)

FOREIGN PATENT DOCUMENTS

| JP | 2004-318204 | 11/2004 |
| JP | 2010-086379 | 4/2010 |
| JP | 2012-142772 | 7/2012 |

OTHER PUBLICATIONS

Japanese Office Action for Japanese Patent Application No. 2014-182873 mailed on Nov. 15, 2016.

*Primary Examiner* — Kanjibhai Patel
(74) *Attorney, Agent, or Firm* — Amin, Turocy & Watson LLP

(57) ABSTRACT

According to an embodiment of the present invention, an imaging apparatus includes an image acquiring unit, a correction region setting unit, and an image correcting unit. The image acquiring unit acquires an image. The correction region setting unit sets a region of correction of a face of a person in the image acquired by the image acquiring unit based on a position of the face of the person in the image. The image correcting unit corrects an image in the region of correction set by the correction region setting unit. Thus, according to the imaging apparatus of the embodiment, it is possible to obtain a face image of a desired shape more simply and easily.

14 Claims, 6 Drawing Sheets

(56) References Cited

U.S. PATENT DOCUMENTS

| | | | | |
|---|---|---|---|---|
| 8,355,602 B2* | 1/2013 | Yamazaki | .......... | G06K 9/00248 |
| | | | | 382/118 |
| 8,374,458 B2* | 2/2013 | Inoue | .................... | H04N 1/407 |
| | | | | 382/274 |
| 8,391,595 B2* | 3/2013 | Hori | .................. | G06K 9/00234 |
| | | | | 382/162 |
| 8,411,911 B2* | 4/2013 | Nakagomi | ......... | G06K 9/00248 |
| | | | | 348/222.1 |
| 8,494,230 B2* | 7/2013 | Kobayashi | ............ | G06T 3/0093 |
| | | | | 382/118 |
| 8,503,738 B2* | 8/2013 | Usui | ................ | G06K 9/00228 |
| | | | | 382/118 |
| 8,699,760 B2* | 4/2014 | Kusama | .................... | G06T 1/00 |
| | | | | 382/118 |
| 8,712,111 B2* | 4/2014 | Otsuka | .................... | G06T 11/60 |
| | | | | 382/107 |
| 8,781,258 B2* | 7/2014 | Hayaishi | ............ | G06K 9/00228 |
| | | | | 345/581 |

* cited by examiner

FIG. 4
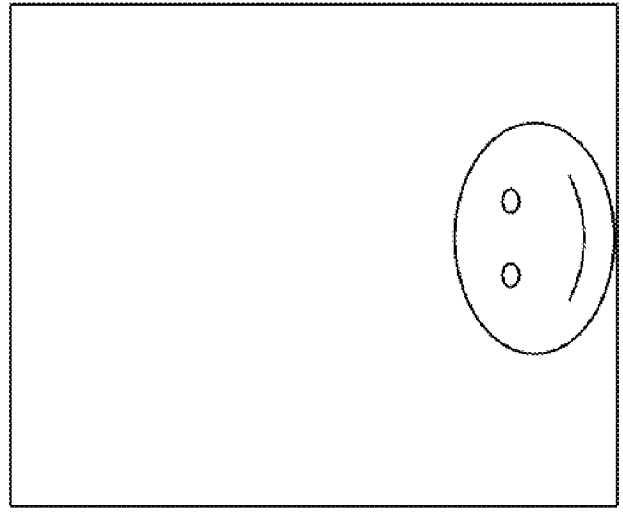
<LOWER PART>
INTENSITY OF CORRECTION:
HIGH
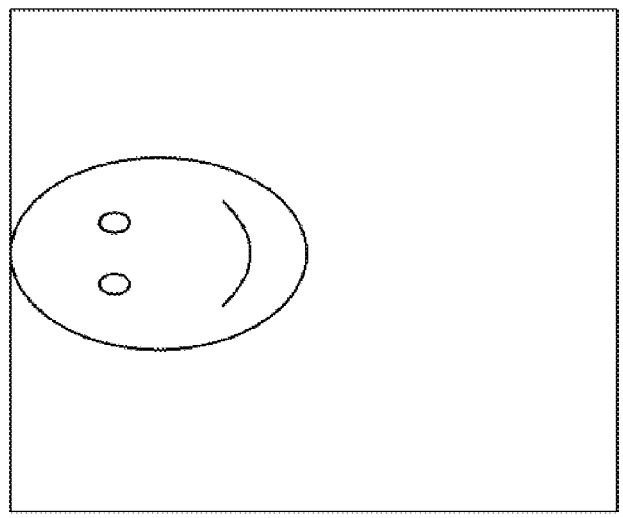
<UPPER PART>
INTENSITY OF CORRECTION:
ZERO OR LOW
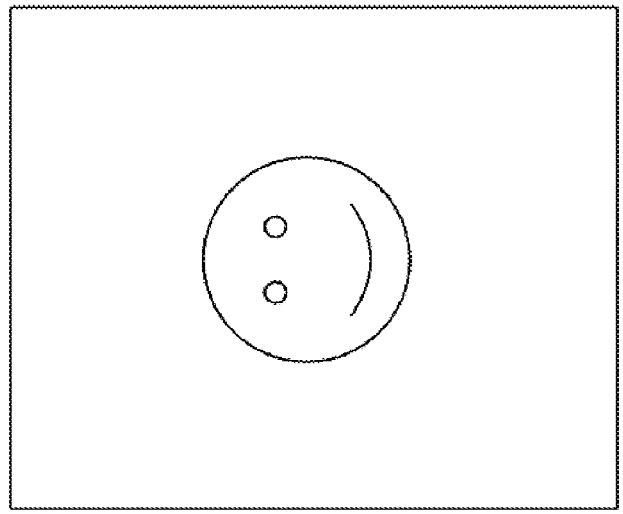
<VICINITY OF CENTER>
INTENSITY OF CORRECTION:
STANDARD

IMAGE CORRECTING APPARATUS, IMAGE CORRECTING METHOD AND COMPUTER READABLE RECORDING MEDIUM RECORDING PROGRAM THEREON

CROSS-REFERENCE TO RELATED APPLICATIONS

This application is based upon and claims the benefit of priority under 35 USC 119 of Japanese Patent Application No. 2014-182873 filed on Sep. 9, 2014 the entire disclosure of which, including the description, claims, drawings, and abstract, is incorporated herein by reference in its entirety for all purposes.

BACKGROUND OF THE INVENTION

1. Field of the Invention

The present invention relates to an image correcting apparatus, an image correcting method and a computer readable recording medium for recording a program for correcting an image of a person.

2. Description of the Related Art

Conventionally, there has been known a technology for correcting a face of a person in a captured image to be a desired shape. For example, Japanese Patent Application Laid-Open Publication No. 2012-142772 published on Jul. 26, 2012 discloses a technology for extracting a contour of a face of a person in an image and performing correction for the contour.

SUMMARY OF THE INVENTION

According to an embodiment of the present invention, an image correcting apparatus is provided. The image correcting apparatus includes an acquiring section configured to acquire an image, a setting section configured to set a region of correction of a face of a person in a predetermined position based on a position of the face of the person in the image, and a correcting section configured to correct an image in the region of correction.

According to an embodiment of the present invention, an image correcting method is provided. The image correcting method includes acquiring an image, setting a region of correction of a face of a person in a predetermined position based on a position of the face of the person in the image, and correcting an image in the region of correction.

According to an embodiment of the present invention, a non-transitory computer-readable recording medium for recording a program readable by a computer is provided. The program causes the computer to perform steps of acquiring an image, setting a region of correction of a face of a person in a predetermined position based on a position of the face of the person in the image, and correcting an image in the region of correction.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

Here:

FIG. 4 is a schematic diagram for explaining changes in correction intensity according to positions of a face.

DETAILED DESCRIPTION OF THE PREFERRED EMBODIMENT

Hereinafter, embodiments of the present invention will be described with reference to the accompanying drawings.

Figure 1:
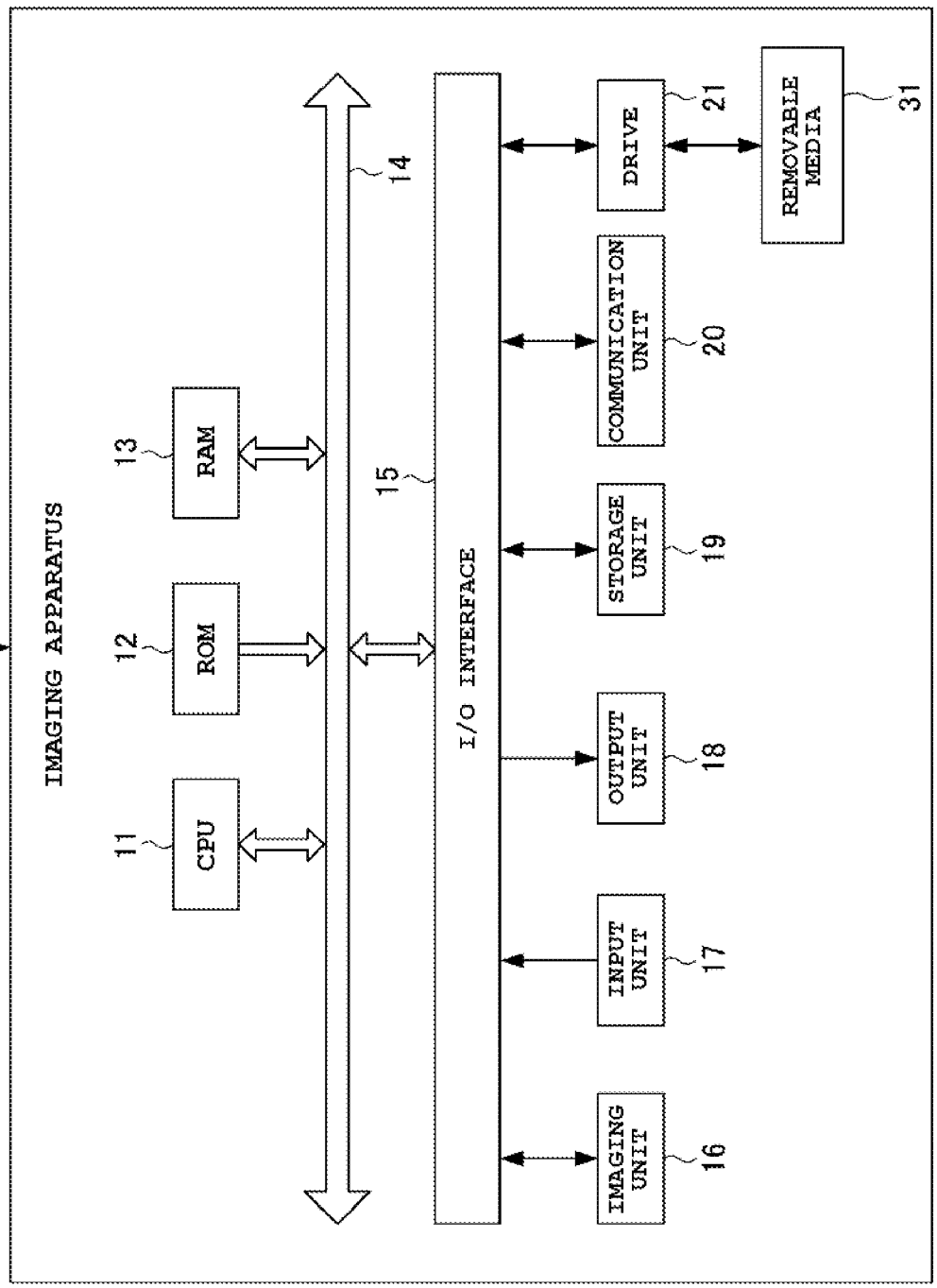
FIG. 1 is a block diagram showing a hardware configuration of an imaging apparatus according to an embodiment of the present invention.

FIG. 1 is a block diagram showing a hardware configuration of an imaging apparatus 1 according to an embodiment of the present invention. For example, the imaging apparatus 1 is realized by a digital camera.

The imaging apparatus 1 includes a CPU (Central Processing Unit) 11, a ROM (Read Only Memory) 12, a RAM (Random Access Memory) 13, a bus 14, an I/O interface 15, an imaging unit 16, an input unit 17, an output unit 18, a storage unit 19, a communication unit 20, and a drive 21.

The CPU 11 executes various processes according to programs stored in the ROM 12 or loaded in the RAM 13 from the storage unit 19.

In the RAM 13, there are stored data necessary for the CPU 11 to execute various processes, and the like.

The CPU 11, the ROM 12 and the RAM 13 are connected to each other via the bus 14. The I/O interface 15 is also connected to the bus 14. The imaging unit 16, the input unit 17, the output unit 18, the storage unit 19, the communication unit 20, and the drive 21 are connected to the I/O interface 15.

The imaging unit 16 includes an optical lens unit and an image sensor (not shown in the drawing).

The optical lens unit includes lenses for collecting light to photograph a subject such as a focus lens and a zoom lens.

The focus lens forms an image of a subject on a light-receiving surface of the image sensor. The zoom lens freely changes the focal length within a predetermined range. Further, the optical lens unit is provided with a peripheral circuit to adjust parameters such as focusing, exposure, and/or white balancing, as necessary.

The image sensor includes a photoelectric conversion element, an AFE (Analog Front End), and the like.

The photoelectric conversion element includes a CMOS (Complementary Metal Oxide Semiconductor) type photoelectric conversion element, for example. The subject's image is input to the photoelectric conversion element from the optical lens unit. The photoelectric conversion element performs photoelectric conversion (image capturing) of the subject's image and accumulates image signals for a predetermined period of time. The photoelectric conversion element provides the AFE with the accumulated image signals sequentially.

The AFE executes various signal processing operations such as A/D (Analog/Digital) conversion on the analog image signals. Digital signals are generated by the signal processing operations and output as output signals of the imaging unit 16.

The output signal of the imaging unit 16 is hereinafter referred to as "data of a captured image". The data of the captured image is supplied to the CPU 11.

The input unit 17 includes various buttons, and a variety of information is input via the input unit 17 in response to manipulation by a user.

The output unit 18 includes a display, a speaker, or the like, and outputs images or voices.

The storage unit 19 includes a hard disk, a DRAM (Dynamic Random Access Memory), or the like, and various image data is stored therein.

The communication unit 20 controls communication with different devices (not shown in the drawing) via a network such as Internet.

A removable media 31 including a magnetic disk, an optical disk, a magneto-optical disc, a semiconductor memory, or the like, is mounted on the drive 21. A program read out from the removable media 31 by the drive 21 is installed in the storage unit 19 as necessary. Similarly to the storage unit 19, the removable media 31 stores various data such as the image data stored in the storage unit 19.

For example, the conventional slim face correction extracts a contour of a jaw of a face from an image for which image correction will be performed (hereinafter, referred to as an "image to be corrected") and performs the image correction for the extracted face line of the jaw. However, in the case that extraction of the contour of the jaw fails, for example, by extracting a contour of a portion other than the jaw in the image, this method cannot perform the image correction for a proper area and results in an unnatural face image.

The embodiment of the present invention performs image correction, not for a contour of a portion regarded as the jaw based on the shape of the jaw, but for an area around the mouth including the right and left jaws of a detected face.

Figure 2:
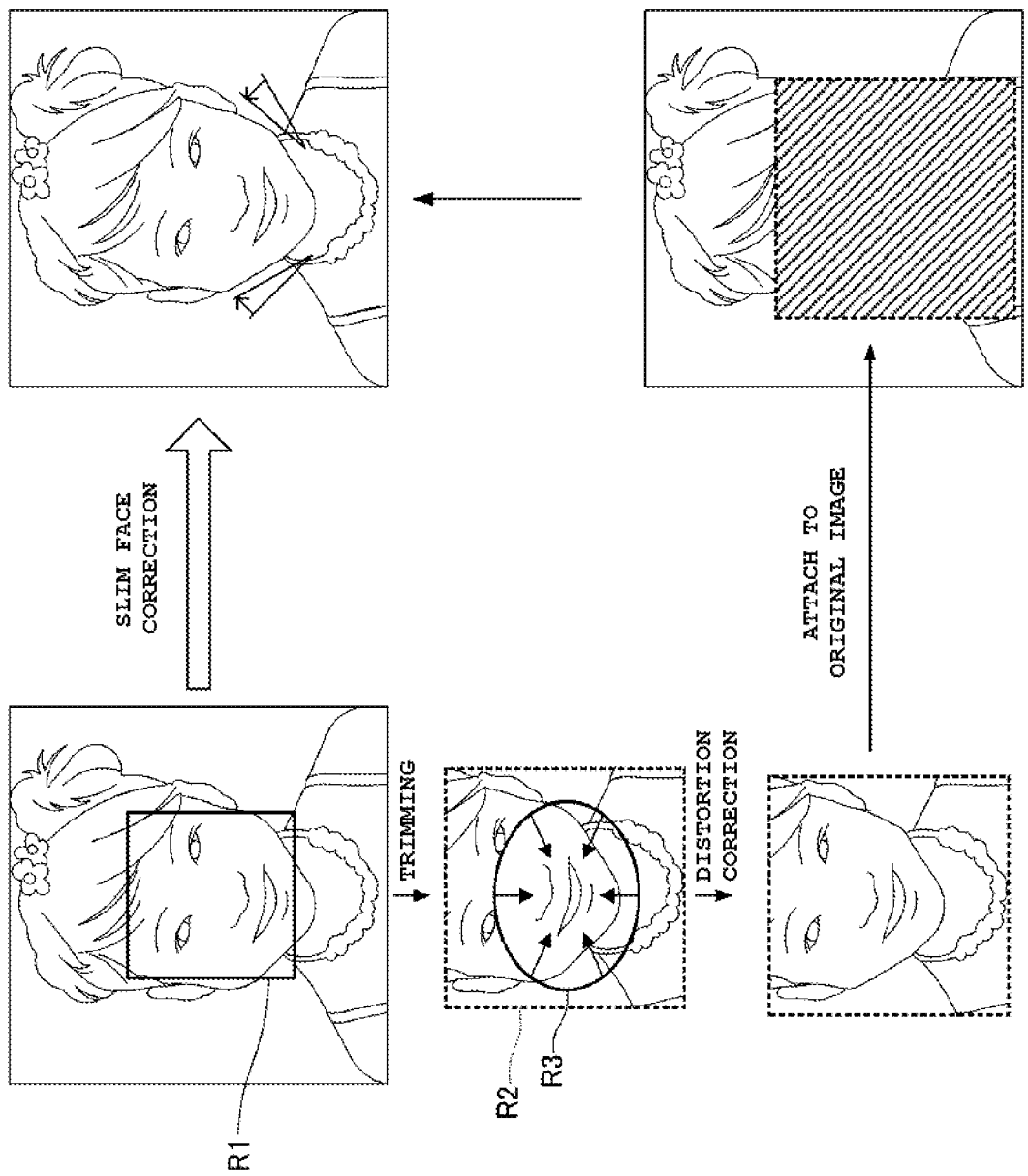
FIG. 2 is a schematic diagram for explaining a method of slim face correction according to the embodiment.

FIG. 2 is a schematic diagram for explaining a method of slim face correction according to the present embodiment. The method of slim face correction according to the present embodiment trims a predetermined area including an area to be corrected (hereinafter, referred to as a "trimming area") R2 off an image to be corrected based on a, frame set to distinguish a detected face (hereinafter, referred to as a "face frame") R1 to cut off an image of the trimming area R2 as shown in FIG. 2. The method does not perform image correction for the whole of the cut image (hereinafter, referred to as a "trimming image"). The method performs distortion correction for a predetermined region (hereinafter, referred to as a "correction region") R3. Then, the trimming image is attached to the original image to make a composite image. Thus, an image to which the slim face correction has been applied is generated.

Now, a method for setting the trimming area R2 and the correction region R3 is described.

Figure 3:
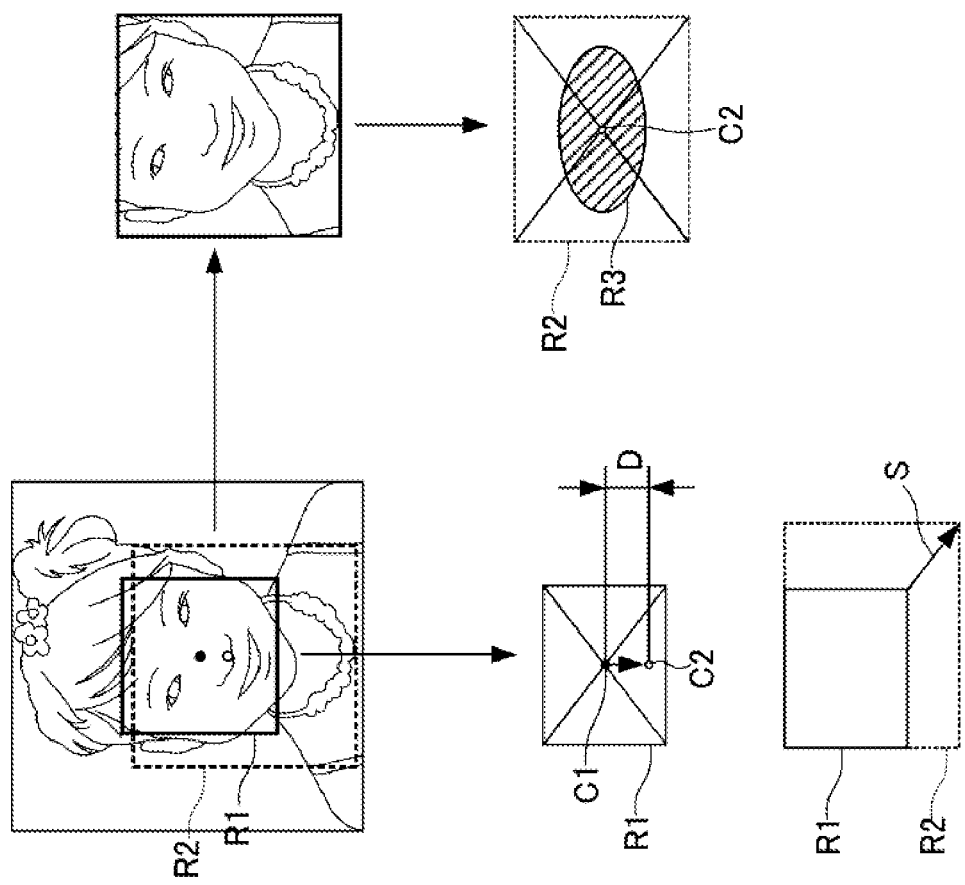
FIG. 3 is a schematic diagram for explaining a method for setting a trimming area and a correction region.

FIG. 3 is a schematic diagram for explaining the method for setting the trimming area R2 and the correction region R3.

As shown in FIG. 3, the trimming area R2 of the image to be corrected is set such that a center position C2 of the trimming area R2 is a position shifted by a predetermined distance D (in the present embodiment, 20~30% of the vertical length of the face frame R1) in the downward direction of the face (toward the jaw) from a center position C1 of the face frame R1 set by the face detection and its size is a predetermined ratio S (in the present embodiment, from 1.5 to 1.9 times) larger than the size of the face frame R1. Since the center position C2 of the trimming area R2 and the ratio S for the detected face are experientially obtained by verification and the like, they can be changed according to shooting situations.

Conceptually, the face frame R1 is set in a position so that it includes the eyes, the eyebrows and a contour of the jaw of the face. The center position C2 is set to a position shifted to the vicinity of the nose of the face from the center position C1 of the set face frame. The trimming area R2 is set so that its size is the ratio S larger than the size of the face frame R1 to include the contour of the jaw with the center in the vicinity of the nose.

Further, in the present embodiment, the image correction is performed, not for the whole of the trimming image, but for a predetermined region (the correction region) R3 in the trimming image. The correction region R3 is a predetermined region around the center C2 of the trimming image (In the present embodiment, the region has the shape of an ellipse with the longer axis in the horizontal direction of the face and the outermost edge of the region is a little inside the sides of the trimming image.). An intensity of correction for the correction region R3 is set to be higher in the direction of the major axis than in the direction of the minor axis in the correction region.

By setting the correction region R3 as described above, the image correction is not performed for parts near the edges of the trimming image. Thus, in the case of generating a composite image in the manner of attaching the trimming image to the original image, no processing is required to adjust boundaries between the trimming image and parts other than the trimming image of the original image.

As above, since the image correction is performed for the area including a region around the mouth including the right and left jaws without contour extraction, the present embodiment can reduce processing burden of the image correction and shorten the processing time of the slim face correction compared to an approach of extracting contours of the right and left jaws and performing image correction for each of the contours.

The image correction for the correction region R3 is a kind of distortion correction of adjusting pixels (for example, pulling pixels) toward the center of the correction region to make the face slimmer than the original, as shown in FIG. 2.

In addition, in the present embodiment, in the case of using a wide-angle lens, a degree of intensity of image correction (hereinafter, referred to as a "correction intensity") is changed in consideration of distortion resulted from correction of distortion due to the wide-angle lens (hereinafter, referred to as "lens aberration correction"). In other words, since the lens aberration correction affects some positions of an image in the case of using the wide-angle lens, the present embodiment is configured to change the correction intensity according to positions in the correction region (in the present embodiment, a position of a face).

FIG. 4 is a schematic diagram for explaining changes in correction intensity according to positions of a face.

As shown in FIG. 4, in the case that the face is positioned in the vicinity of the center of an image, the correction intensity is set to standard because the face is not affected by the lens aberration correction.

In the case that the face is positioned in the upper part of the image, the head portion is stretched and the face becomes slimmer and longer because the face is affected by the lens aberration correction. Therefore, the correction intensity is set to zero (i.e. correction is not required) or a low value.

In the case that the face is positioned in the lower part of the image, the jaw portion is stretched and the face becomes wider because the face is affected by the lens aberration correction. Therefore, the correction intensity is set to a high value.

Figure 5:
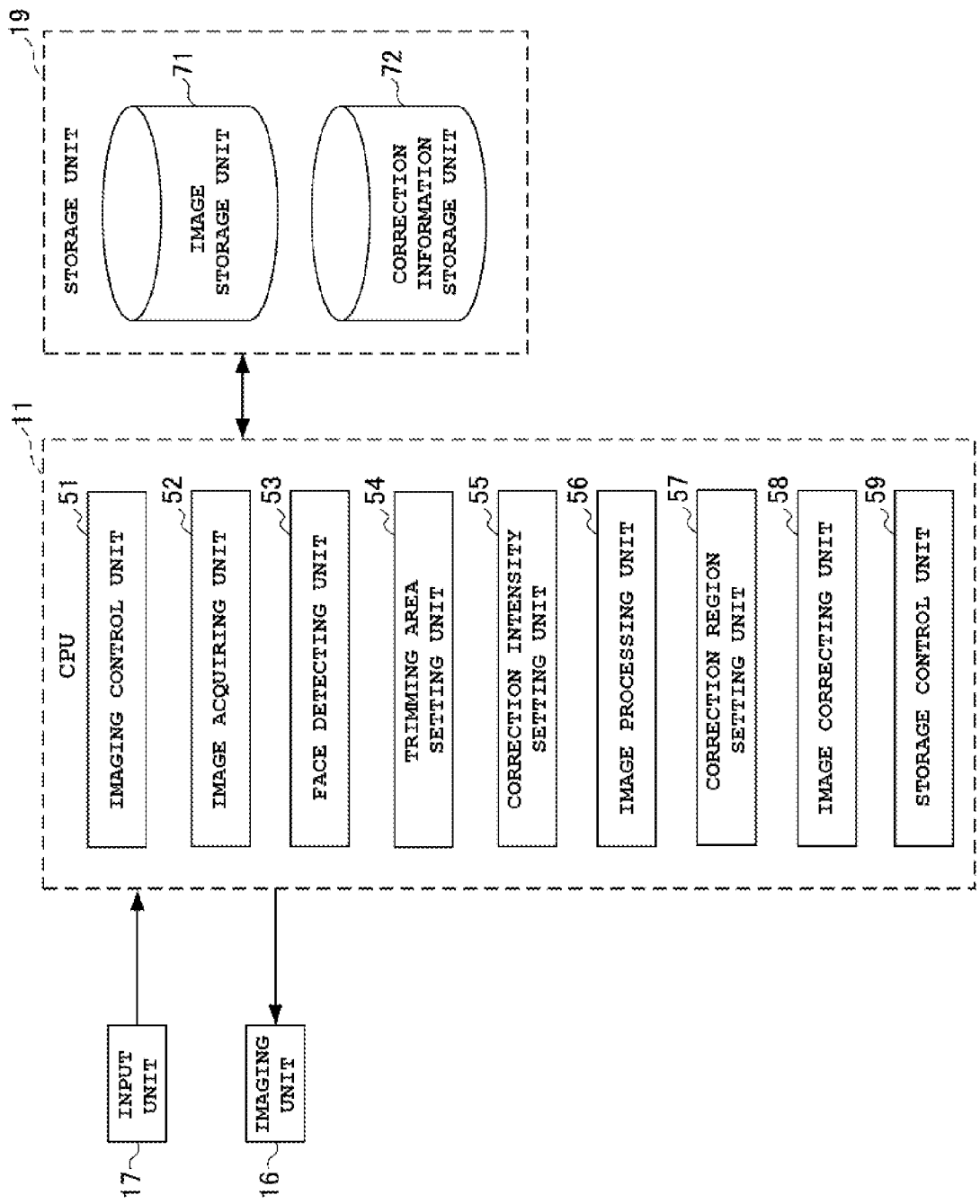
FIG. 5 is a functional block diagram showing a functional configuration of the imaging apparatus of FIG. 1 for executing a slim face correction process.

FIG. 5 is a functional block diagram showing a functional configuration of the imaging apparatus 1 for executing a slim face correction process.

The slim face correction process means a series of actions taken in order to, in the case that a face is detected in a captured image, cut off an image of a trimming area based on the position of the face and perform correction of correction intensity determined based on the position of the face for the cut trimming image to generate a corrected image without extracting a contour of the jaw of the face.

In the case of executing the slim face correction process, an imaging control unit 51, an image acquiring unit 52, a face detecting unit 53, a trimming area setting unit 54, a correction intensity setting unit 55, an image processing unit 56, a correction region setting unit 57, an image correcting unit 58, and a storage control unit 59 of the CPU 11 function as shown in FIG. 5.

In an area of the storage unit 19, an image storage unit 71 and a correction information storage unit 72 are configured.

In the image storage unit 71, there is stored data of images acquired from the imaging unit 16, images acquired from the outside, and/or corrected images to which image correction processing has been executed.

In the correction information storage unit 72, there is stored information on correction (hereinafter, referred to as "correction information") such as setting values for the trimming area, the correction intensity according to the position of the face, setting values of the correction region, or a method for distortion correction. More specifically, the setting values for the trimming area are a value of shift amount from the center position of the face frame and/or a value of the size ratio. The correction intensity according to the position of the face corresponds to the center/the upper part/the lower part of the image as shown in FIG. 4.

The imaging control unit 51 controls the imaging unit 16 to perform shooting. The image acquiring unit 52 acquires image data (hereinafter, also referred to as a "captured image") of the image shot by the imaging unit 16 by imaging processes.

The face detecting unit 53 performs face detection for the captured image acquired by the image acquiring unit 52. The face detecting unit 53 determines whether or not a face exists in the captured image. The face detecting unit 53 also detects a face position in the image when detecting the face. For example, as shown in FIG. 4, the face position detected by the face detecting unit 53 is the center, the upper part, or the lower part of the image.

The trimming area setting unit 54 sets the trimming area based on the correction information stored in the correction information storage unit 72. As shown in FIG. 3, the trimming area R2 is set such that the center position C2 of the trimming area R2 is a position shifted by the predetermined distance D in the direction toward the jaw of the face from the center position C1 of the face frame and its size is the predetermined ratio S larger than the size of the face frame. By this, an area whose center is a region around the lower part of the nose is set as the trimming area R2.

The correction intensity setting unit 55 sets the correction intensity according to the face position in the image detected by the face detecting unit 53 based on the correction information stored in the correction information storage unit 72. As shown in FIG. 4, the correction intensity is set to standard in the case that the face position is in the vicinity of the center of the image, to zero (i.e. unnecessary) or a low value in the case that the face position is in the upper part, or to a high value in the case that the face position is in the lower part.

The image processing unit 56 executes trimming. More specifically, the image processing unit 56 cuts off an image of the set trimming area (hereinafter, referred to as the "trimming image") from the captured image. By this, the trimming image whose center is a region around the lower part of the nose is cut.

Further, the image processing unit 56 generates a composite image in the manner of attaching the trimming image to the original image after the image correcting unit 58 performs image correction for the trimming image. Thus, a corrected image is generated.

Based on the correction information stored in the correction information storage unit 72, the correction region setting unit 57 sets the correction region at a position set based on the face frame. More specifically, the correction region setting unit 57 sets a predetermined region around the center of the trimming image cut off based on the face frame as the correction region. In the present embodiment, the correction region setting unit 57 sets a region which has the shape of an ellipse with the longer axis in the horizontal direction of the face and of which outermost edge is a little inside the sides of the trimming image as the correction region.

The image correcting unit 58 executes the image correction processing based on the correction information stored in the correction information storage unit 72. More specifically, the image correcting unit 58 executes a kind of distortion correction of pulling the horizontal direction of the set correction region in the trimming image toward the center of the correction region at a higher intensity than the vertical direction as shown in FIG. 2, for example. By this, the image is distorted in the portion of the jaw so that the jaw becomes slimmer. Further, the distortion correction is performed for the correction region and its vicinity, but is not performed for parts near the outer edges of the cut image. Thus, in the case of generating a composite image in the manner of attaching the trimming image to the original image from which the trimming image was cut, no processing is required to adjust boundaries between the trimming image and parts other than the trimming image of the original image.

The storage control unit 59 allows the generated image to be stored in the image storage unit 71.

Figure 6:
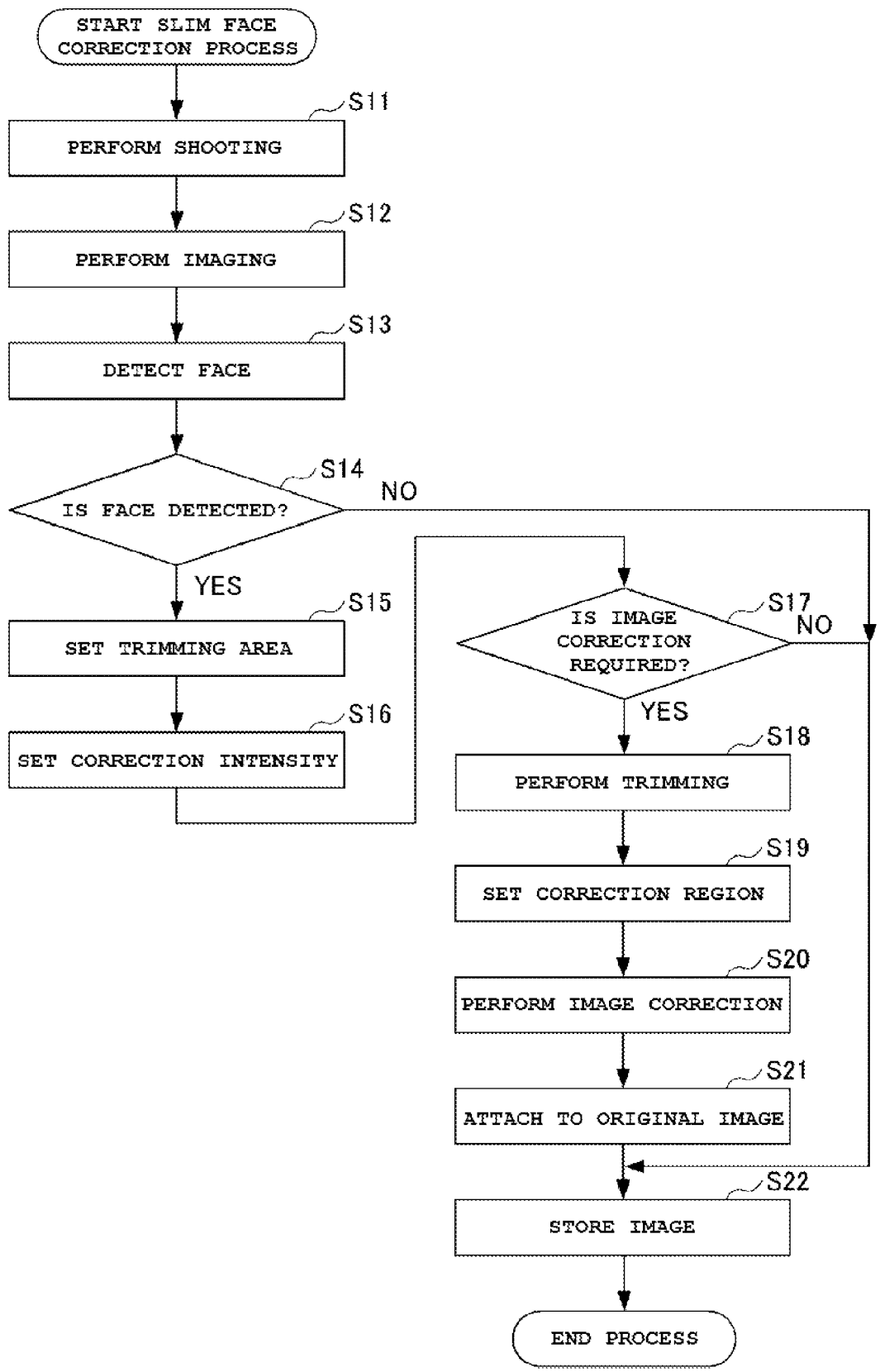
FIG. 6 is a flow chart for showing the slim face correction process executed by the imaging apparatus of FIG. 1 including the functional configuration shown in FIG. 5.

FIG. 6 is a flow chart for showing the slim face correction process executed by the imaging apparatus 1 of FIG. 1 including the functional configuration shown in FIG. 5.

The slim face correction process is started by an operation to instruct to start the slim face correction process input to the input unit 17 by the user.

At Step S11, the imaging control unit 51 controls the imaging unit 16 to perform shooting.

At Step S12, the image acquiring unit 52 acquires a captured image by performing imaging processes.

At Step S13, the face detecting unit 53 performs face detection for the captured image acquired by the image acquiring unit 52.

At Step S14, the face detecting unit 53 determines whether or not a face exists in the captured image as a result of the face detection. In the case that a face exists in the image, the face detecting unit 53 also detects a position of the face in the image.

In the case that it is determined that no face exists, the determination at Step S14 is "NO" and the slim face correction process ends.

In the case that it is determined that a face exists in the image, the determination at Step S14 is "YES" and the process proceeds to Step S15.

At Step S15, the trimming area setting unit 54 sets the trimming area based on the correction information stored in the correction information storage unit 72. As shown in FIG. 3, the trimming area is set such that the center position C2 of the trimming area is a position shifted by the predetermined distance D in the direction toward the jaw of the face from the center position C1 of the face frame R1 and its size is the predetermined ratio S larger than the size of the face frame R1. By this, an area around the lower part of the nose is set as the trimming area R2.

At Step S16, the correction intensity setting unit 55 sets the correction intensity according to the position of the face in the image detected by the face detecting unit 53 based on the correction information stored in the correction information storage unit 72. As shown in FIG. 4, the correction intensity is set to standard in the case that the face position is in the vicinity of the center of the image, to zero (i.e. unnecessary) or a low value in the case that the face position is in the upper part, or to a high value in the case that the face position is in the lower part.

At Step S17, the image correcting unit 58 determines whether or not to execute the image correction processing. The determination of whether to execute the image correction processing is made by determining whether the correction intensity is set to zero (i.e. unnecessary) or any other value.

In the case that the image correction processing is not executed, the determination at Step S17 is "NO" and the process proceeds to Step S22. The Step S22 will be described later.

In the case that the image correction processing is executed, the determination at Step S17 is "YES" and the process proceeds to Step S18.

At Step S18, The image processing unit 56 executes trimming. More specifically, the image processing unit 56 cuts off an image of the set trimming area from the captured image (see FIG. 2). By this, the trimming image around the lower part of the nose is cut off.

At Step S19, the correction region setting unit 57 sets the correction region based on the correction information stored in the correction information storage unit 72. More specifically, the correction region setting unit 57 sets a region which has the shape of an ellipse with the longer axis in the horizontal direction and in which the center position C2 of the trimming image is the center of correction as the correction region R3.

At Step S20, the image correcting unit 58 executes the image correction processing based on the correction information stored in the correction information storage unit 72. More specifically, the image correcting unit 58 executes a kind of distortion correction of pulling the horizontal direction of the correction region R3 set by the correction region setting unit 57 toward the center of correction of the correction region R3 at a higher intensity than the vertical direction, as shown in FIG. 2. By this, the image is distorted in the portion of the jaw so that the jaw becomes slimmer. Further, the distortion correction is performed for the correction region and its vicinity, but is not performed for parts near the outer edges of the cut image. Thus, in the case of generating a composite image in the manner of attaching the cut image to the original image, no processing is required to adjust boundaries between the trimming image and parts other than the trimming image of the original image.

At Step S21, the image processing unit 56 generates a composite image in the manner of attaching the trimming image to the original image after the image correcting unit 58 performs image correction for the trimming image (see FIG. 2). By this, the slim face correction is performed for the image to be corrected and an image corrected so as to have a slimmer face is generated.

At Step S22, the storage control unit 59 allows the generated image to be stored in the image storage unit 71. Then, the slime face correction process is ended.

The flow chart of the slim face correction process is modified so that Step S17 is performed prior to Step S15 after the position of the face in the image to be corrected is detected and it can be determined whether to generate a corrected image at the early stage. Thus, in the case that the determination at Step S17 is "NO", it is desirably possible to prevent wasteful processing from being performed.

According to the conventional technology, contours of a face are extracted and image processing is performed only for contours of right and left cheeks. For this reason, processing for extracting contours is required. On the other hand, the present invention does not require contour extraction. According to the present invention, the correction process can be executed with information on the face frame by correcting an elliptical area around the mouth. Further, since the present invention requires only one time of correction process, processing time can be reduced. In addition, it is possible to achieve a slim face more effectively by detecting where a face is in the shooting range and to which direction the face heads to further consider lens aberration and adjusting an intensity of effect based on the detection result. As above, according to the imaging apparatus 1 of the embodiments, it is possible to make a person's face in an image slim easily and effectively.

The imaging apparatus 1 configured as described above includes the image acquiring unit 52, the correction region setting unit 57, and the image correcting unit 58.

The image acquiring unit 52 acquires an image.

The correction region setting unit 57 sets a region of correction of a face of a person in the image acquired by the image acquiring unit 52 based on a position of the face of the person in the image.

The image correcting unit 58 corrects an image in the region of correction set by the correction region setting unit 57.

Thus, according to the imaging apparatus 1 of the embodiments, it is possible to obtain a face image of a desired shape more simply and easily because the correction is performed for a new position set based on the position of the face of the person.

In some embodiments, the imaging apparatus 1 further includes the face detecting unit 53 for determining a position of the face of the person in the image.

The image correcting unit 58 corrects an image in the region of correction at an intensity according to the determination by the face detecting unit 53.

By this, according to the imaging apparatus 1 of the embodiments, it is possible to obtain a face image of a desired shape more simply and easily because an intensity of correction is changed according to the position of the face in the image, for example, in the case that lens aberration correction is required.

In some embodiments, the imaging apparatus 1 further includes the image processing unit 56 for cutting off an area whose center is the region of correction based on the position of the face and making a composite image in the manner of attaching the cut area to the image in its original position.

The image correcting unit 58 corrects a shape in an image in the region of correction included in the area cut by the image processing unit 56.

By this, according to the imaging apparatus 1 of the embodiments, the correction is performed only for a feature which a user wants to correct because the correction is performed for the cut area. Thus, the correction does not affect areas other than the area to be corrected.

In some embodiments, the image correcting unit 58 performs correction for adjusting pixels toward the center of the region of correction to make the face slimmer than the original.

By this, according to the imaging apparatus 1 of the embodiments, it is possible to obtain a face image of a desired shape more simply and easily because correction for making the jaw slim can be performed, for example.

In some embodiments, the correction region setting unit 57 sets a region of the shape of an ellipse as the region of correction. The shape of the ellipse includes an almost circular shape.

By this, according to the imaging apparatus 1 of the embodiments, the correction can be performed for a region around the mouth and it is possible to obtain a face image of a desired shape more simply and easily.

In addition, the present invention is not limited to the embodiments described above and various modifications and alternatives which can achieve the objects of the invention fall within the scope of the present invention.

In the embodiments described above, the trimming area is cut off. However, in another embodiment, the correction may be performed only for a correction region specified from the trimming area in the image to be corrected without cutting off the trimming area.

Further, a case in which a face is leaning to one side is not explicitly mentioned in the embodiments described above. In some embodiments, in the case that a face is leaning toward the center of an image, the correction intensity is high. In the case that a face is not leaning toward the center of the image, the correction intensity is low (or correction is not performed). In the case that a face is in an edge of the image, the correction region can be set so that the shape of the face in the edge of the image can be distorted.

Further, in the embodiments described above, the present invention has been applied to a digital camera as an example of the imaging apparatus 1 without limitation.

For example, the present invention can be applied to general electronic devices having the function of slim face correction processing.

More specifically, the present invention can be applied to a notebook type personal computer, a printer, a television, a video camera, a portable navigation device, a mobile phone, a smart phone, a portable game device, and the like.

The process sequence described above can be executed by hardware or software.

In other words, the functional configuration shown in FIG. 5 is merely an example and the present invention is not limited thereto. The imaging apparatus 1 suffices if it has a function for performing the process sequence as a whole. Functional blocks to use to implement this function are not limited to the embodiment of FIG. 5.

In addition, a functional block may be configured by a piece of hardware, a piece of software, or their combination.

In the case that the sequence is performed by software, a program configuring the software is installed in a computer or the like from a network or a storage medium.

The computer may be a computer which is incorporated in dedicated hardware. In addition, the computer may be a computer capable of executing various functions by installing various programs therein, for example, a general-purpose personal computer.

A storage medium for recording such a program may include not only the removable media 31 shown in FIG. 1 which is distributed separately from the apparatus's main body to provide it to users, but also a storage medium or the like which is provided to users in a state of being incorporated in the apparatus's main body in advance. The removable media 31 includes, for example, a magnetic disk (including a floppy disk), an optical disc, a magneto-optical disk, or the like. For example, the optical disc includes a compact disk-read only memory (CD-ROM), a digital versatile disk (DVD), a Blu-ray (Registered Trademark) disc, or the like. The magneto-optical disk includes a Mini-Disk (MD), or the like. In addition, the storage medium which is provided to the users in a state of being incorporated in the apparatus's main body in advance includes, for example, the ROM 12 in FIG. 1 in which a program is recorded, a hard disk included in the storage unit 19 in FIG. 1, or the like.

Further, in the description presented here, the steps describing a program recorded in a recording medium include not only processes to be executed serially in time in order, but also processes which are not necessarily executed serially in time but in a parallel manner or individually.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image correcting apparatus, comprising:
a processor; and
a memory having instructions stored therein that when executed by the processor perform operations comprising:
acquiring an image;
setting a region of correction of a face of a person in a predetermined position based on a position of the face of the person in the image;
cutting off an area whose center is included in the region of correction based on the position of the face;
making a composite image in a manner of attaching the area to the image in its original position; and
correcting an image in the region of correction,
wherein the correcting corrects a shape in the image in the region of correction included in the area.

2. The image correcting apparatus of claim 1 further comprising determining the position of the face of the person in the image,
wherein the correcting corrects the image in the region of correction according to the determining.

3. The image correcting apparatus of claim 1, wherein the correcting performs correction for adjusting pixels toward the center of the region of correction to make the face slimmer than the original.

4. The image correcting apparatus of claim 1, wherein the setting sets a region of the shape of an ellipse as the region of correction.

5. The image correcting apparatus of claim 1, wherein the setting sets the region of correction so that the center position of the region of correction is disposed in a position below the center position of a face frame based on the position of the face of the person in the image.

6. An image correcting method comprising:
acquiring, by a system comprising a processor, an image;
setting, by the system, a region of correction of a face of a person in a predetermined position based on a position of the face of the person in the image;
cutting off, by the system, an area whose center is included in the region of correction based on the position of the face;
making, by the system, a composite image in a manner of attaching the cut area to the image in its original position; and
correcting, by the system, an image in the region of correction, wherein the correcting corrects a shape in the image in the region of correction included in the cut area.

7. The image correcting method of claim 6 further comprising determining, by the system, the position of the face of the person in the image,
wherein the correcting further comprises correcting the image in the region of correction according to the determination.

8. The image correcting method of claim 6, wherein the correcting further comprises performing correction for adjusting pixels toward the center of the region of correction to make the face slimmer than the original.

9. The image correcting method of claim 6, wherein the setting further comprises setting the region of correction so that the center position of the region of correction is disposed in a position below the center position of a face frame based on the position of the face of the person in the image.

10. A non-transitory computer-readable recording medium for recording a program readable by a computer, the program causing the computer to perform steps of:
acquiring an image;
setting a region of correction of a face of a person in a predetermined position based on a position of the face of the person in the image;
cutting off an area whose center is the region of correction based on the position of the face;
making a composite image in a manner of attaching the cut area to the image in its original position; and
correcting an image in the region of correction, wherein the correcting comprises correcting a shape in the image in the region of correction included in the cut area.

11. The non-transitory computer-readable recording medium of claim 10, wherein the program causes the computer to further perform determining the position of the face of the person in the image, and
the correcting further comprises correcting the image in the region of correction according to the determination.

12. The non-transitory computer-readable recording medium of claim 10, wherein the correcting further comprises performing correction for adjusting pixels toward the center of the region of correction to make the face slimmer than the original.

13. The non-transitory computer-readable recording medium of claim 10, wherein the setting further comprises setting a region of the shape of an ellipse as the region of correction.

14. The non-transitory computer-readable recording medium of claim 10, wherein the setting further comprises setting the region of correction so that the center position of the region of correction is disposed in a position below the center position of a face frame based on the position of the face of the person in the image.

* * * * *